H. G. DREYER.
DEVICE FOR FASTENING AUTOMOBILE TOPS.
APPLICATION FILED FEB. 20, 1911. RENEWED JAN. 11, 1913.
1,070,672.
Patented Aug. 19, 1913.
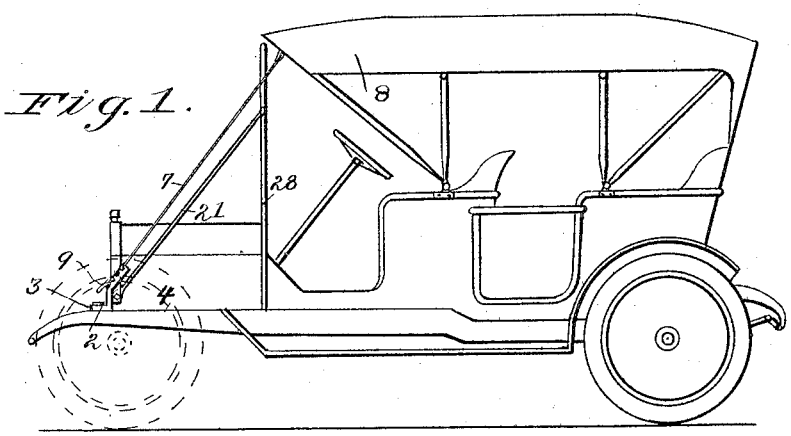
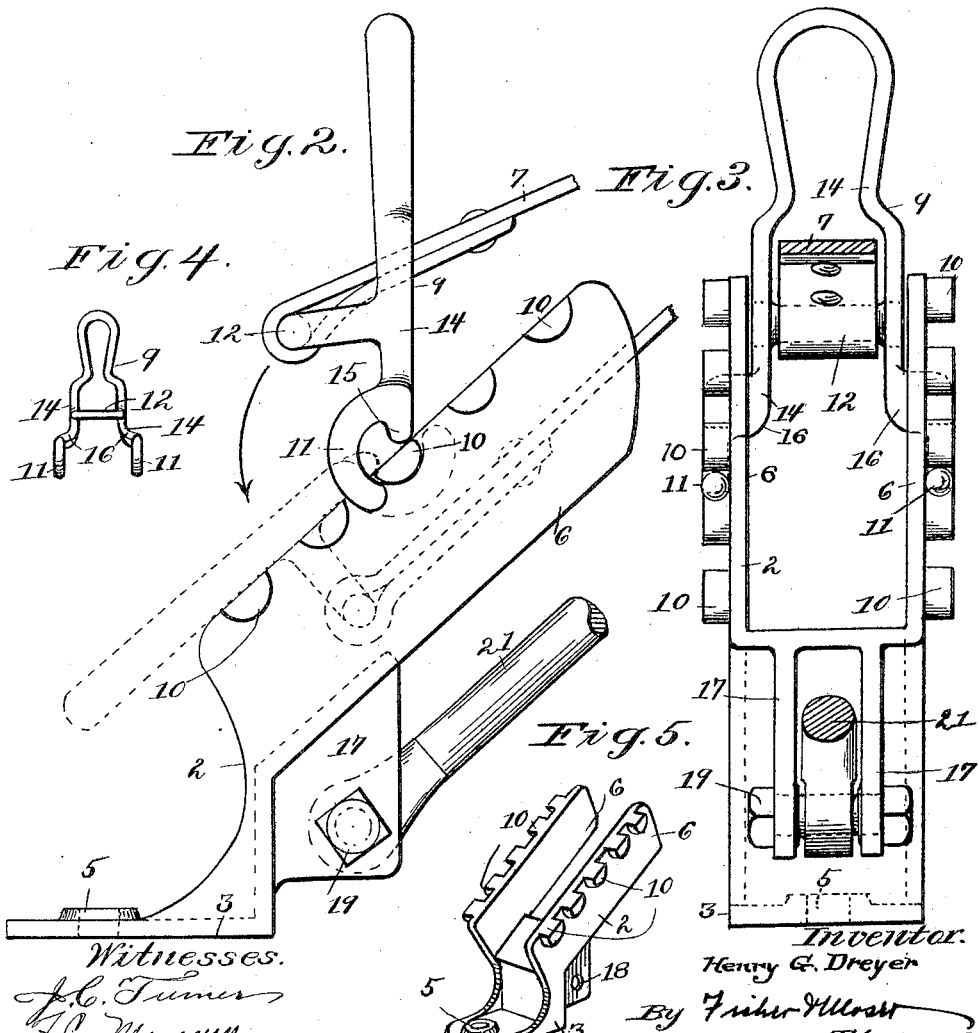

UNITED STATES PATENT OFFICE.

HENRY G. DREYER, OF CLEVELAND, OHIO.

DEVICE FOR FASTENING AUTOMOBILE-TOPS.

1,070,672.   Specification of Letters Patent.   Patented Aug. 19, 1913.

Application filed February 20, 1911, Serial No. 609,659.   Renewed January 11, 1913.   Serial No. 741,571.

*To all whom it may concern:*

Be it known that I, HENRY G. DREYER, citizen of the United States, residing at Cleveland, in the county of Cuyahoga and State of Ohio, have invented certain new and useful Improvements in Devices for Fastening Automobile-Tops, of which the following is a specification.

My invention relates to improvements in devices for fastening automobile tops, and the improvement comprises a separable construction of parts adapting quick attachment or detachment thereof under tension, substantially as herein shown and described and particularly pointed out in the claims.

In automobiles having collapsible or foldable tops it is customary to provide a flexible strap or brace connection between the upper front edge of the top and the chassis frame at either side of the machine.

Now, my object is to provide a device which will permit quick and convenient attachment or detachment of the strap whenever occasion requires and which will also take up the slack in the strap and yield in the top and place the strap under tension to firmly stay the top and at the same time effect and maintain self-locking of the separable parts of the device.

My device is also additionally constructed to serve as a brace connection for the windshield of an automobile as well as the top.

In the accompanying drawings, Figure 1 is a side view of an automobile showing my improvement embodied therein. Fig. 2 is a side elevation, full-size, of my device showing initial hook engagement between the parts in full lines and locked relation in dotted lines. Fig. 3 is an end view looking in at the right of Fig. 2. Fig. 4 is a reduced view of the lever-hook for the strap, and Fig. 5 is a perspective view of the forked bracket used with said lever-hook.

In detail, the device comprises a forked bracket —2— having a right-angled base 3 adapted to be secured to some part of the automobile, such as the chassis frame 4, by means of a bolt, rivet or screw passing through opening 5 in base 3. The forked arms 6 of the bracket are integral with base 3 and extend upwardly therefrom at any suitable angle or inclination, say approximately forty-five degrees, and these arms are spaced apart and parallel and have sufficient height to provide a trough or channel to confine strap 7 for free working. This strap is attached in various ways to the front portion of collapsible top 8 and extends downwardly therefrom to rigidly stay said top when the strap is suitably connected to the front end of the machine, which in the present instance is by lever-hook 9 and forked bracket 2. Thus, arms 6 have a series of companion lugs 10 extending laterally on the outside and along their upper edges, and these lugs are flat-faced on top and rounded at their bottom—being substantially semi-circular in cross section. Lever-hook 9 on the other hand is also of semi-circular formation, that is to say the hooks 11 have this form to permit a pivotal or hinged engagement with said lugs, and strap 7 is permanently secured to cross-bar 12 which integrally unites the sides 14 of the lever-hook at a point some distance above the hook ends. This cross-bar is also offset in respect to the plane of the handle and the pivotal or fulcrum engaging center of the lever-hook, and the strap is free to play between the sides 14 when the parts are brought to engaging and rotating position, as in Fig. 2 wherein the full lines indicate entrance of hooks 11 between a pair of lugs 10, and the dotted lines of the lever-hook and strap show locked relations. In turning the lever-hook from the vertical position shown, strap 7 is drawn taut and placed under tension,—the top yielding more or less under the strain or pull; and ample leverage is obtained to accomplish this operation easily and effectively. Self-locking is achieved by reason of this tension as applied to offset cross-bar 12 which when down and between arms 6 is beneath fulcrum legs 10, the strap being carried off-center relatively to the most direct line of its pull. An integral lobe 15 in the same plane as sides 14 projects radially into the inner circle of each hook 11 and is adapted to contact with the flat or upper face of lugs 10 to make rotation of lever-hook 9 easy, particularly at the beginning or when initial engagement and attachment is effected. This lobe also acts as a stop; but the limit of closing movement of lever-hook 9 is more particularly fixed by the outwardly turned extremities 16 of sides 14, see Fig. 4.

Bracket 2 is strengthened at the meeting angles of arms 6 and base 3 by a pair of flanges 17, which have opposite openings 18 for a bolt 19. These flanges serve a further useful purpose, as the wind-shield 20 at the front of the machine and beneath top 8 is generally provided with a brace-rod 21 which may be detachably fastened to the bracket between flanges 17 by bolt 19.

Separate sets of companion lugs 10 permit lever-hook 9 to be engaged and rotated with like tension-applying effects for strap 7 at different points on the forked bracket, all regardless of stretch in the strap or variable change in conditions after prolonged use. Therefore, my concept viewed broadly is to provide a self-locking strap holder and tension-applying device adapted to permit quick and convenient attachment and detachment at several different fixed points, and I do not wish to limit myself to the specific construction shown and described herein but wish to include all modifications thereof permissible under a liberal interpretation of my claims.

What I claim is:

1. In automobiles, a device to fasten and stay the top comprising a two-sided bracket fixed at an upward and rearward inclination on the front of the machine and having lugs along the top edge of each side rounded on their bottom and spaced apart at intervals, in combination with an open hand-lever having two semi-circular hooked ends adapted to engage at both sides beneath said lugs, said lever having a cross-bar at about its middle raised above the plane of the sides thereof, and a strap rotatably affixed to said cross-bar at one end and to the automobile top at the other, whereby tension-applying and self-locking effects may be obtained.

2. In devices to stay the tops of automobiles, a bracket having a flat base fixed to the automobile and side arms extending upward and rearward at an inclination therefrom and provided with integral perforated flanges in the meeting angles between said base and said arms to strengthen the bracket and also to provide a brace-rod connection, said arms having lugs at intervals on their outside along their top edges, in combination with a two-sided lever adapted to detachably engage said lugs and provided with an off-set cross-bar between its ends on its outer side adapted to swing downward beneath the plane of said lugs when the parts are operatively engaged, and a strap engaged with said cross-bar at one end and with the automobile top at the other end.

3. In a device to stay automobile tops, a strap holder comprising an open two-sided lever having curved hook shaped ends and a cross-bar at its outer side offset in respect to the plane of the lever, in combination with a bracket having two inclined sides spaced apart in parallel relation and provided each with a series of spaced lugs of semi-circular formation at the sides thereof adapted to be rotatably engaged by said hook ends and flexible connections between said cross-bar and the automobile top.

In testimony whereof I affix my signature in the presence of two witnesses.

HENRY G. DREYER.

Witnesses:
R. B. MOSER,
F. C. MUSSUN.

---

Copies of this patent may be obtained for five cents each, by addressing the "Commissioner of Patents, Washington, D. C."